US012663699B1

(12) United States Patent
Wang

(10) Patent No.: US 12,663,699 B1
(45) Date of Patent: Jun. 23, 2026

(54) PROJECTION DEVICE

(71) Applicant: Chunlan Wang, Ganzhou (CN)

(72) Inventor: Chunlan Wang, Ganzhou (CN)

( * ) Notice: Subject to any disclaimer, the term of this patent is extended or adjusted under 35 U.S.C. 154(b) by 0 days.

(21) Appl. No.: 19/252,525

(22) Filed: Jun. 27, 2025

(30) Foreign Application Priority Data

Jun. 5, 2025 (CN) .......................... 202521144888.6

(51) Int. Cl.
| | |
|---|---|
| *G03B 21/10* | (2006.01) |
| *G03B 21/14* | (2006.01) |
| *G03B 21/32* | (2006.01) |
| *G03B 21/44* | (2006.01) |

(52) U.S. Cl.
CPC ........... *G03B 21/10* (2013.01); *G03B 21/142* (2013.01); *G03B 21/145* (2013.01); *G03B 21/326* (2013.01); *G03B 21/44* (2013.01)

(58) Field of Classification Search
CPC .... G03B 21/10; G03B 21/142; G03B 21/145; G03B 21/326; G03B 21/44
USPC .......................................................... 353/79
See application file for complete search history.

(56) References Cited

U.S. PATENT DOCUMENTS

2017/0241623 A1 * 8/2017 Zhang ..................... F21V 23/04
2023/0230508 A1 * 7/2023 Liu ......................... G09B 27/04
353/20

FOREIGN PATENT DOCUMENTS

CN          201040946 Y * 3/2008 ............ E05B 15/00
CN          221507307 U * 8/2024 ............ G03B 21/14

* cited by examiner

*Primary Examiner* — Magda Cruz
(74) *Attorney, Agent, or Firm* — HOWARD M COHN and Associates, LLC

(57) ABSTRACT

A projection device is provided, including a main body, a cover body, a light-emitting assembly, a film assembly, and an imaging assembly. The cover body is movably connected to the main body. The light-emitting assembly is configured to emit light signals. The film assembly is disposed on a transmission path of the light signals. The imaging assembly is configured to image the light signals after passing through the film assembly, when the cover body covers the main body, the imaging assembly is disposed on one side of the film assembly facing away from the light-emitting assembly. The light-emitting assembly and the film assembly are disposed in the main body, and the imaging assembly is disposed in the cover body. The projection device enables improved user convenience.

20 Claims, 9 Drawing Sheets

PROJECTION DEVICE

TECHNICAL FIELD

The present disclosure relates to a technical field of projection, and in particular to a projection device.

BACKGROUND

Projection devices are widely employed to various applications, such as home theaters, stage performances, and automotive lighting, to project images or text onto floors, walls, or other surfaces. However, conventional projection devices typically integrate all components within a fixed housing. Such integrated design necessitates disassembly of an entire device when maintenance, cleaning, or replacement of internal components (e.g., a film assembly) is required, which is cumbersome and time-consuming, thereby consequently increasing maintenance costs and user difficulty.

SUMMARY

Embodiments of the present disclosure provide a projection device whose user convenience is improved.

The present disclosure provides the projection device, including a main body, a cover body, a light-emitting assembly, a film assembly, and an imaging assembly. The cover body is movably connected to the main body. The light-emitting assembly is configured to emit light signals. The film assembly is disposed on a transmission path of the light signals. The imaging assembly is configured to image the light signals after passing through the film assembly, when the cover body covers the main body, the imaging assembly is disposed on one side of the film assembly facing away from the light-emitting assembly. The light-emitting assembly and the film assembly are disposed in the main body, and the imaging assembly is disposed in the cover body.

Furthermore, the cover body defines an opening, the imaging assembly is at least partially disposed in the opening to emit light therethrough.

Furthermore, the cover body is rotatably connected to the main body, so as to cover or open the main body.

Furthermore, the projection device further includes an elastic component, the elastic component is elastically connected between the cover body and the main body, and the elastic component is configured to drive the cover body to cover the main body.

Furthermore, the projection device further includes a rotating shaft, the cover body is rotatably connected to the main body through the rotating shaft. The elastic component is a torsion spring, the elastic component is sleeved on the rotating shaft and is configured to drive the cover body to cover the main body.

Furthermore, the cover body includes an outer frame and a rotating cover, the outer frame is movably connected to the main body, the outer frame defines a mounting hole on a middle portion, the rotating cover is disposed in the mounting hole and is capable of rotating with respect to the outer frame, the rotating cover is connected to the imaging assembly and is capable of driving the imaging assembly to rotate to adjust a distance between the imaging assembly and the film assembly.

Furthermore, the cover body includes a cover plate, the cover plate is connected to the outer frame and is disposed at a first side of the rotating cover facing the main body. The cover plate defines a through hole, the imaging assembly is disposed in the through hole. First threads are disposed on an outer surface of the imaging surface, second threads are disposed on an inner wall of the through hole, and the second threads are threadedly engaged with the first threads, so as to adjust the distance between the imaging assembly and the film assembly.

Furthermore, protruding ribs are disposed on a second side of the rotating cover facing away from the cover plate, and the protruding ribs are uniformly disposed around the opening.

Furthermore, the imaging assembly includes at least one limiting protrusion, the rotating cover defines at least one limiting groove, the at least one limiting protrusion is engaged with the limiting groove to drive the imaging assembly to rotate by the rotating cover; or, the imaging assembly defines the at least one limiting groove, the rotating cover includes the at least one limiting protrusion, the at least one limiting protrusion is engaged with the limiting groove to drive the imaging assembly to rotate by the rotating cover.

Furthermore, the main body defines a notch on one side facing the cover body, the notch is configured to partially expose the cover body to allow the cover body to be opened.

Furthermore, the film assembly includes a support component and a film sheet, the support component is disposed in the main body, and the film sheet is detachably mounted on the support component. When the cover body and the main body are in an open state, the main body exposes the film sheet.

Furthermore, the support component includes a support portion and a snap-fit portion, the support portion is configured to support the film sheet, the snap-fit portion is connected to a periphery of the support portion, and the snap-fit portion is configured to limit the film sheet.

Furthermore, the snap-fit portion includes snap-fit retainers, the snap-fit retainers are disposed at intervals, a first end of each of the snap-fit retainers is fixedly connected to the support portion, and the snap-fit retainers are configured to clamp the film sheet.

Furthermore, at least some of the snap-fit retainers include a positioning protrusion at a second end thereof, each positioning protrusion is disposed on one side of a corresponding one of the snap-fit retainers facing the film sheet. When the film sheet is mounted on the support component, the film sheet is disposed between each positioning protrusion and the support portion.

Furthermore, the film sheet defines at least one limiting notch, the support portion includes a support plate and at least one limiting portion, the at least one limiting portion protrudes from the support portion, the film sheet is disposed on the support plate, and the at least one limiting portion is disposed in the at least one limiting notch.

Furthermore, the projection device further includes a driving component and a gear assembly. The driving component and the gear assembly are disposed in the main body, the support component includes a toothed portion at an edge thereof, the driving component is engaged with the toothed portion of the support component through the gear assembly to drive the support component and the film sheet to rotate.

Furthermore, the gear assembly includes a driving gear, and a driving shaft of the driving component is fixedly connected to the driving gear. The driving gear is engaged with the toothed portion of the support component.

Furthermore, the projection device further includes a bracket, the bracket is disposed in the main body and is disposed between the light-emitting assembly and the film assembly. The bracket includes a cylindrical body and a plate body disposed surrounding the cylindrical body, the cylindrical body passes through the plate body, and the support component is capable of rotating with respect to the cylindrical body. The film sheet is at least partially disposed opposite to a first end of the cylindrical body, the light-emitting assembly is at least partially disposed opposite to a second end of the cylindrical body. The driving component is disposed on the bracket, the driving component and the support component are respectively at two sides of the plate body.

Furthermore, the projection device further includes a pressing plate, the pressing plate is disposed at one side of the bracket facing away from the light-emitting component, the support component is rotatably disposed at one side of the pressing plate facing away from the bracket, and the pressing plate and the bracket are disposed in the main body.

Furthermore, the projection device further includes a first condenser and a second condenser, the first condenser is disposed at the second end of the cylindrical body, and the second condenser is disposed at the first end of the cylindrical body.

According to the embodiments of the present disclosure, the cover body and the main body are movably connected, enabling convenient opening and closing of the cover body. When the cover body covers the main body, the imaging assembly is precisely positioned on the one side of the film assembly facing away from the light-emitting assembly, thereby ensuring transmission and processing of the light signals along a predetermined path to achieve efficient and accurate projection. By virtue of the ingenious design of the cover body, users may conveniently access an interior of the projection device to carry out maintenance, adjustment, cleaning, and component replacement tasks. By easily opening the cover body, the users may directly access and operate key internal components, such as the film assembly, without disassembling an entire device, thereby enhancing the user convenience. Additionally, maintainability of the projection device is further improved, which significantly reduces maintenance time, and lowers maintenance difficulty, thereby ensuring normal operation of the projection device while facilitating user operation.

BRIEF DESCRIPTION OF DRAWINGS

In order to more clearly illustrate technical solutions in embodiments of the present disclosure, accompanying drawings required in description of the embodiments are briefly described below, and obviously, the accompanying drawings in the following description are merely some embodiments of the present disclosure, and for those who skilled in the art, other drawings may be obtained according to structures shown in these drawings without creative efforts.

For a more complete understanding of the present disclosure and corresponding beneficial effects, following description is made with reference to the accompanying drawings, in which the same reference numerals refer to the same parts.

4

Figure 1:
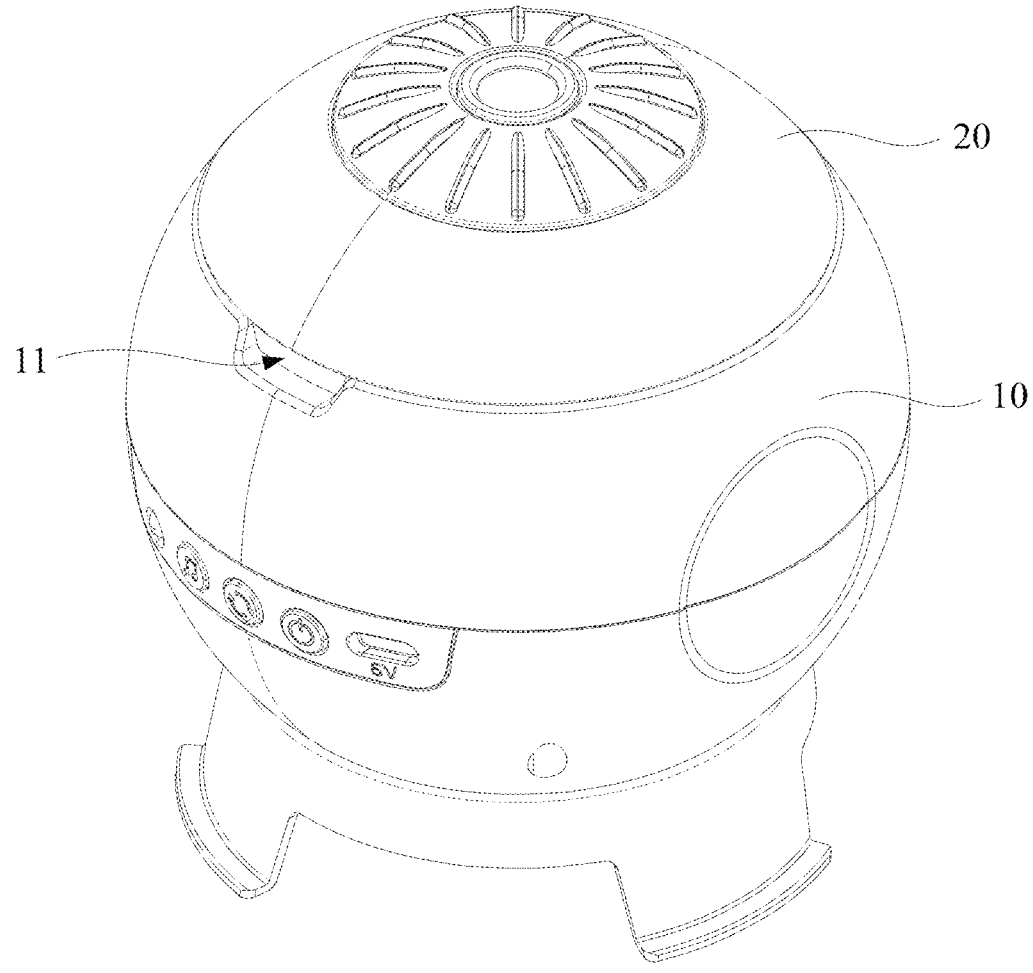
FIG. 1 is a structural schematic diagram of a projection device in a stored state according to one embodiment of the present disclosure.
Figure 5:
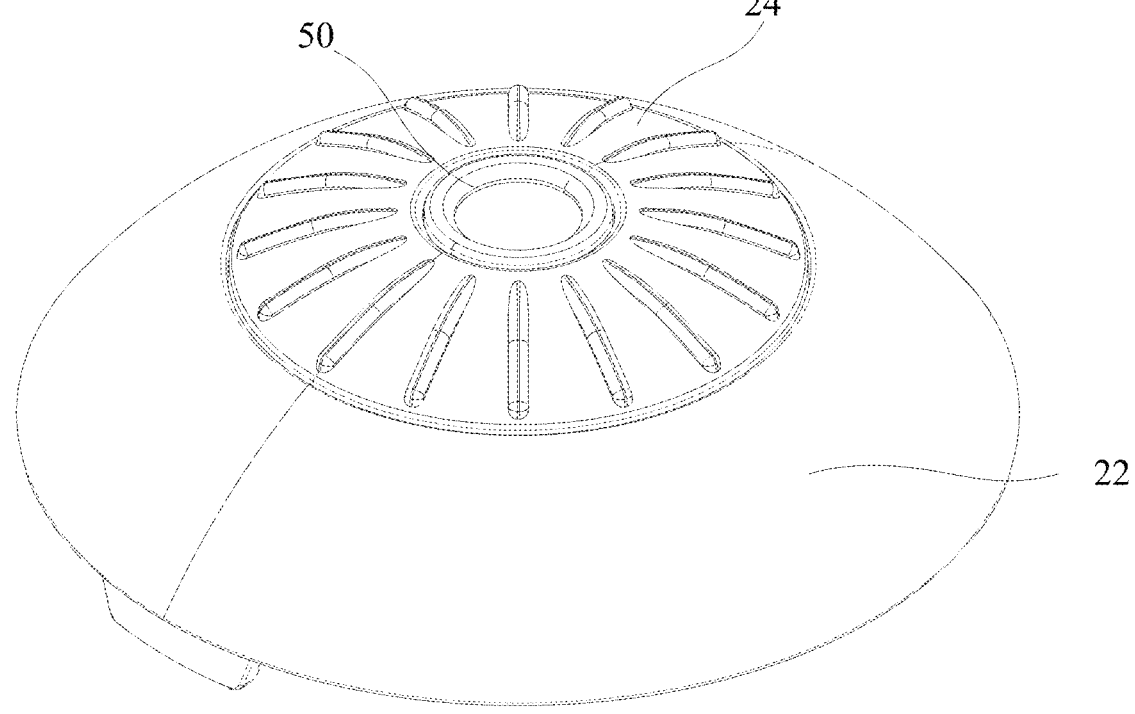

FIG. 5 is a schematic diagram of first partial structures of the projection lamp shown in FIG. 1.

Figure 6:
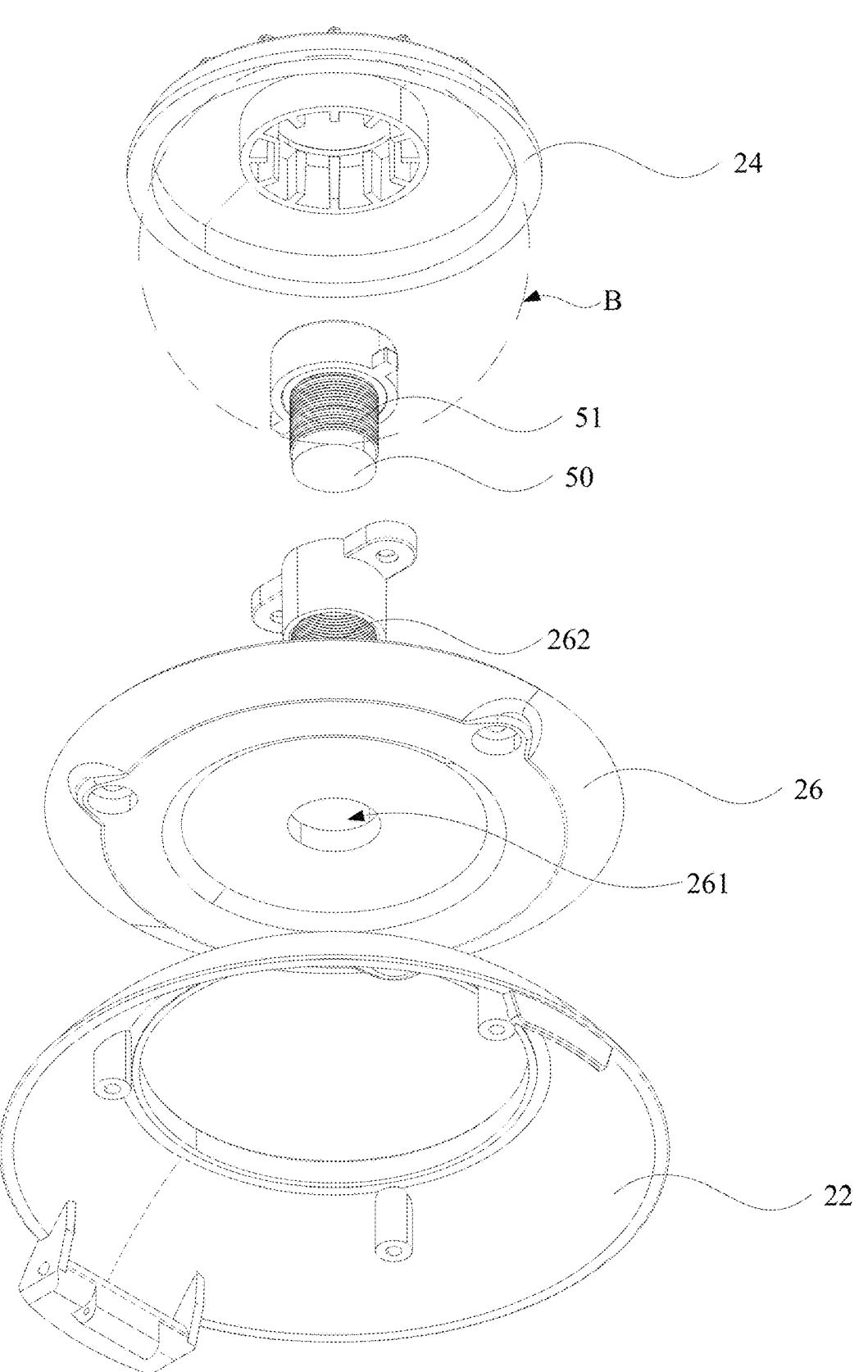

FIG. 6 is an exploded schematic diagram of the first partial structures of the projection device shown in FIG. 5.

Figure 7:
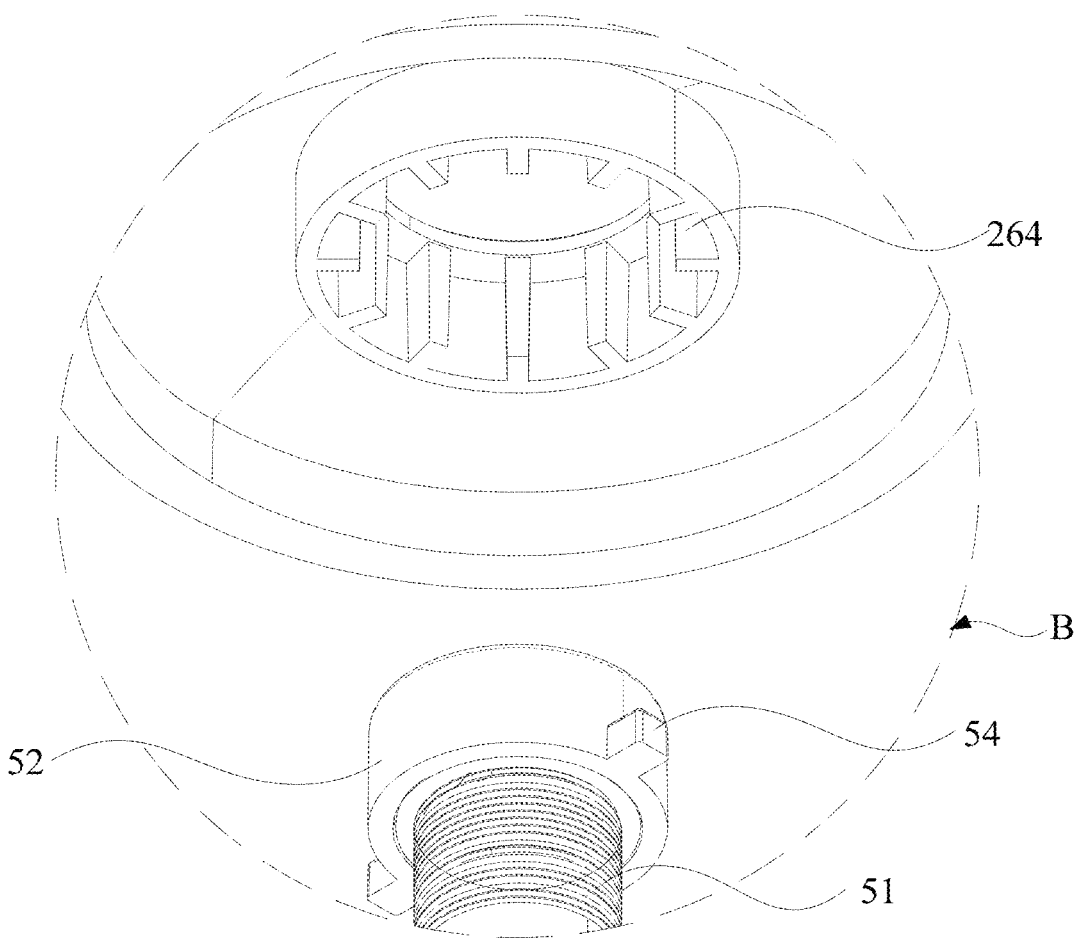

FIG. 7 is an enlarged schematic diagram of portion B shown in FIG. 6.

Figure 8:
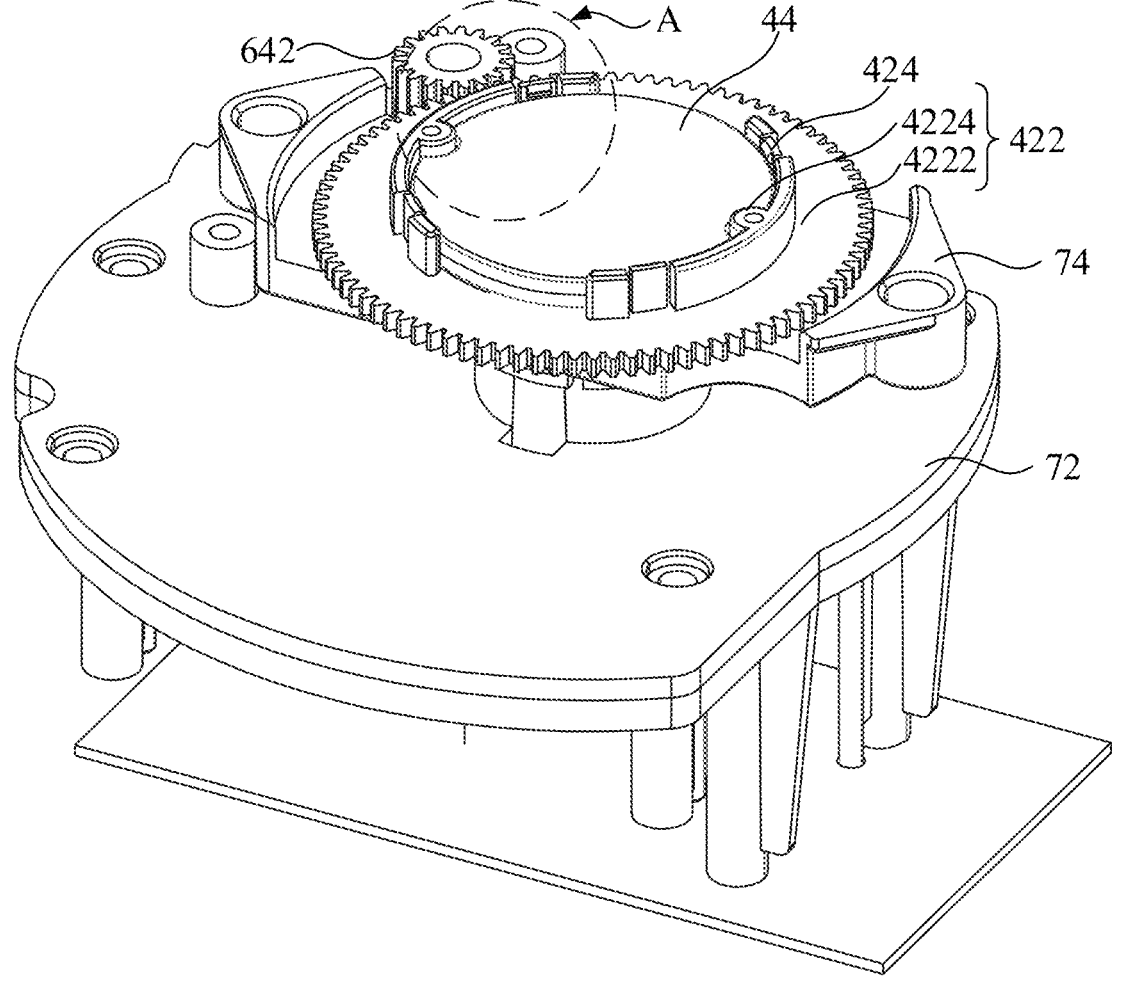

FIG. 8 is a schematic diagram of second partial structures of the projection lamp shown in FIG. 1.

Figure 9:
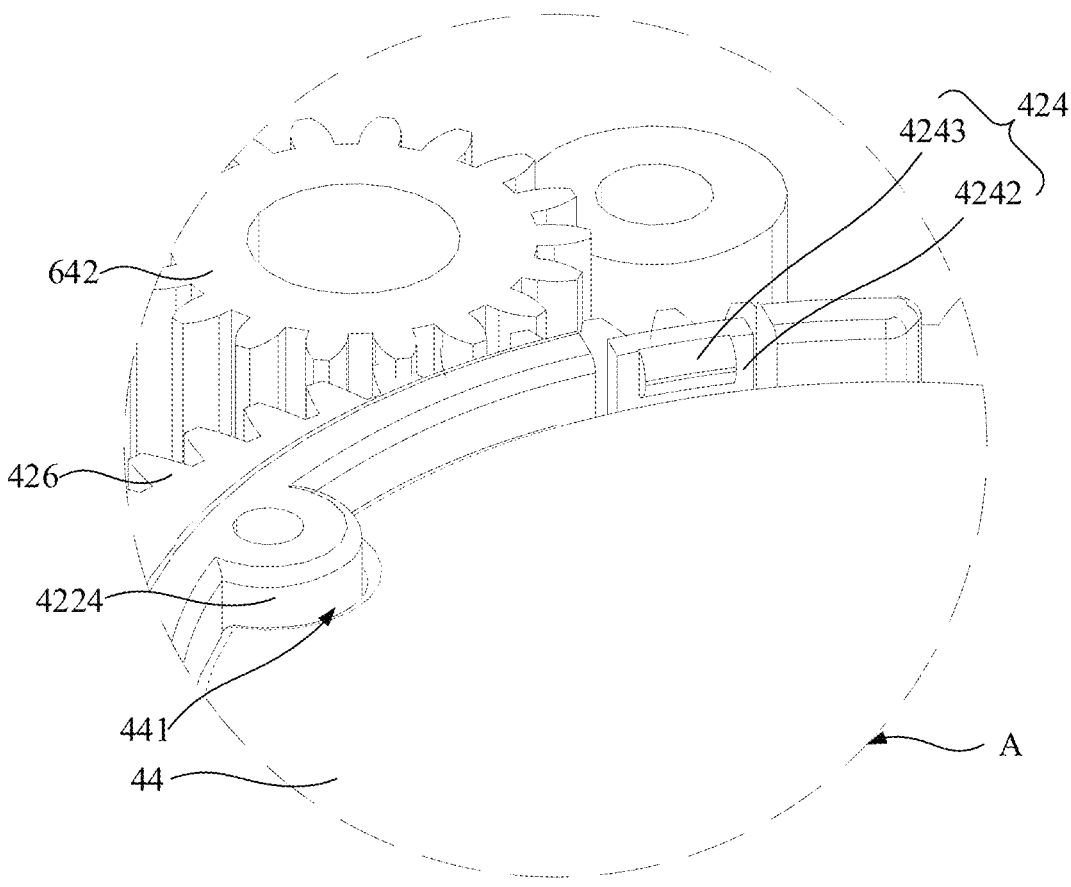

FIG. 9 is an enlarged schematic diagram of portion A shown in FIG. 8.

Reference numerals in the drawings: 10. main body; 11. notch; 12. elastic component; 13. rotating shaft; 14. middle housing body; 16. lower housing body; 18. bottom base; 20. cover body; 21. opening; 22. outer frame; 24. rotating cover; 26. cover plate; 261. through hole; 262. second thread; 264. limiting groove; 30. light-emitting assembly; 40. film assembly; 42. support component; 422. support portion; 4222. support plate; 4224. limiting portion; 424. snap-fit portion; 4242. snap-fit retainer; 4243. positioning protrusion; 426. toothed portion; 44. film sheet; 441. limiting notch; 50. imaging assembly; 51. first thread; 52. barrel; 54. limiting protrusion; 62. driving component; 64. gear assembly; 642. driving gear; 72. bracket; 722. cylindrical body; 724. plate body; 74. pressing plate; 82. first condenser; 84. second condenser; 92. battery; 94. circuit board; 96. speaker.

DETAILED DESCRIPTION OF EMBODIMENTS

The following clearly and completely describes technical solutions in embodiments of the present disclosure with reference to accompanying drawings in the embodiments of the present disclosure. Obviously, described embodiments are only a part but not all of the embodiments of the present disclosure. The following description of at least one exemplary embodiment is merely illustrative in nature and is in no way intended to limit the present disclosure, corresponding applications, or corresponding uses. All other embodiments obtained by those who skilled in the art based on the embodiments of the present disclosure without creative efforts shall fall within a protection scope of the present disclosure.

As used herein, a term "embodiment" means that a particular feature, structure, or characteristic described in connection with an embodiment may be included in at least one embodiment of the present disclosure. Appearance of the term "embodiment" in various locations throughout the specification does not necessarily refer to the same embodiment, nor does it imply that the embodiments of the present disclosure are mutually exclusive, independent, or alternative to one another. Those who skilled in the art may readily appreciate, both explicitly and implicitly, that the embodiments described herein may be combined with other embodiments.

Figure 2:
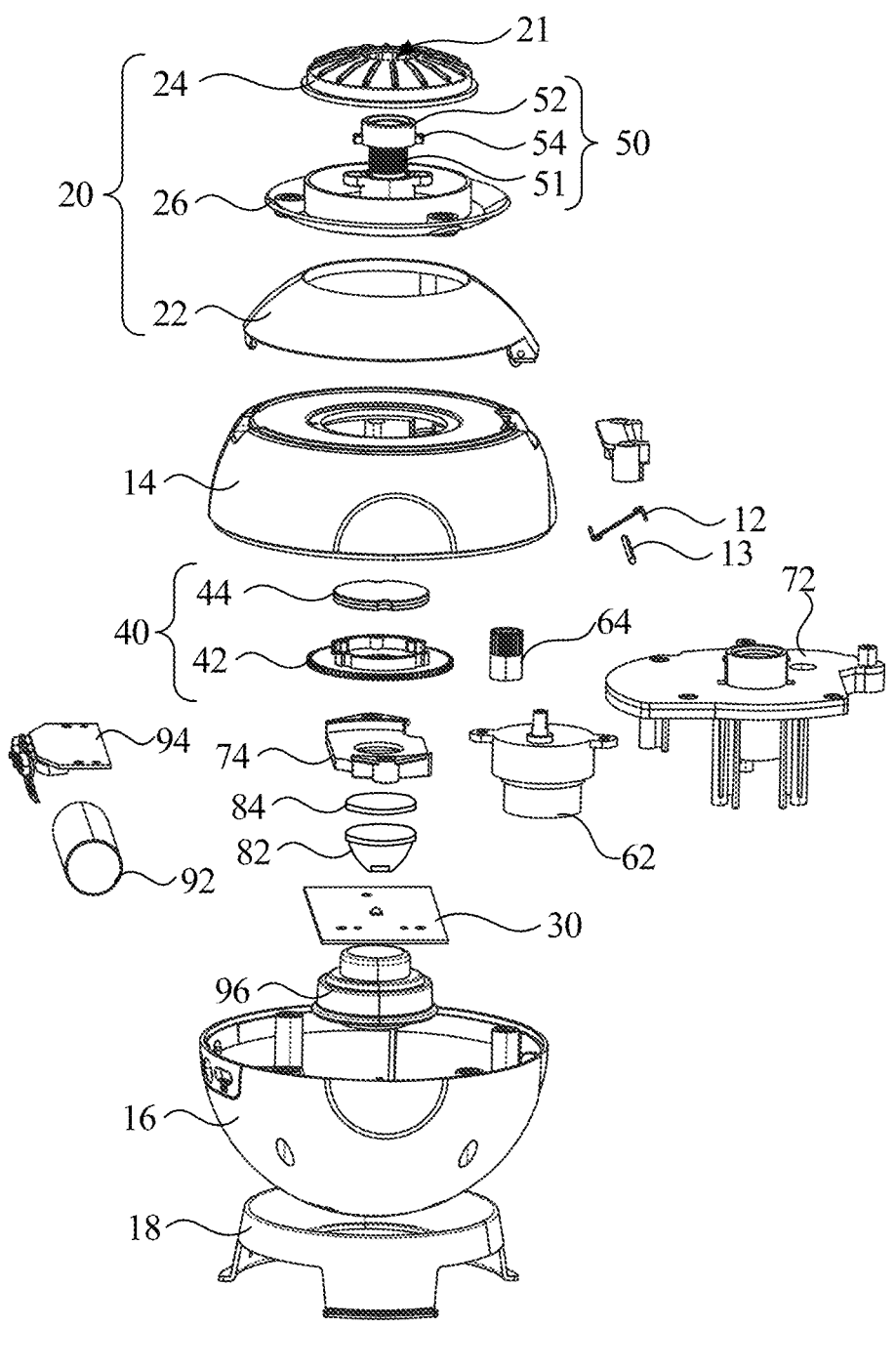
FIG. 2 is an exploded schematic diagram of the projection device shown in FIG. 1.

The embodiments of the present disclosure provide a projection device, as shown in FIGS. 1-2, FIG. 1 is a structural schematic diagram of a projection device in a stored state according to one embodiment of the present disclosure, and FIG. 2 is an exploded schematic diagram of the projection device shown in FIG. 1. The projection device includes a main body 10, a cover body 20, a light-emitting assembly 30, a film assembly 40, and an imaging assembly 50. The cover body 20 is movably connected to the main body 10. The light-emitting assembly 30 is configured to emit light signals. The film assembly 40 is disposed on a transmission path of the light signals. The imaging assembly 50 is configured to image the light signals after passing through the film assembly 40, when the cover body 20 covers the main body 10, the imaging assembly 50 is disposed on one side of the film assembly 40 facing away from the light-emitting assembly 30. The light-emitting assembly 30 and the film assembly 40 are disposed in the main body 10, and the imaging assembly 50 is disposed in the cover body 20.

According to the embodiments of the present disclosure, the main body 10 serves as a support structure of the projection device, the light-emitting assembly 30 and the film assembly 40 are disposed in the main body, and the light-emitting assembly 30 is configured to emit the light signals to provide a light source for subsequent imaging processes. In some embodiments, the light-emitting assembly 30 includes various light-emitting elements, such as light-emitting diodes (LEDs), laser diodes, etc., which is capable of emitting light of different wavelengths, intensities, and colors according to design requirements to fulfill diversified projection requirements. The film assembly 40 is disposed on the transmission path of the light signals and carries various patterns, such as text, images, etc. These patterns constitute content to be projected by the projection device, and the film assembly 40 is configured to modulate the light signals from the light-emitting assembly 30 to form projectable light signals.

The cover body 20 and the main body 10 are movably connected, enabling convenient opening and closing of the cover body 20, and a movable connection method of which includes hinge connections, slide rail connections, magnetic attraction connections, etc., which facilitates effortless and efficient operation of the cover body 20. When the cover body 20 covers the main body 10, the imaging assembly 50 is precisely positioned on the one side of the film assembly 40 facing away from the light-emitting assembly 30, thereby ensuring transmission and processing of the light signals along a predetermined path to achieve efficient and accurate projection. Specifically, when the light signals emitted by the light-emitting assembly 30 pass through the film assembly 40, the light signals acquire pattern information from the film assembly 40 and then accurately enter the imaging assembly 50 disposed in the cover body 20. Lenses within the imaging assembly 50 progressively further process the light signals to ensure formation of clear, magnified patterns on a projection surface. Moreover, when the cover body 20 covers the main body 10, the cover body 20 effectively protects internal components of the projection device against external interference factors, such as dust, debris, and accidental impacts that could cause damage to the internal components.

By virtue of the ingenious design of the cover body 20, users may conveniently access an interior of the projection device to carry out maintenance, adjustment, cleaning, and component replacement tasks. By easily opening 21 the cover body 20, the users may directly access and operate key internal components, such as the film assembly 40, without disassembling an entire device, thereby enhancing the user convenience. Additionally, maintainability of the projection device is further improved, which significantly reduces maintenance time, and lowers maintenance difficulty. For example, the users may quickly replace the film assembly 40 to achieve display of different images, or conveniently replace a damaged light-emitting assembly 30 without affecting normal operation of the imaging assembly 50, further enhancing practicality and user experience of the projection device. Thus, the ingenious design of the cover body 20 in the embodiments of the present disclosure ensures normal operation of the projection device while facilitating user operation.

In some embodiments, the cover body 20 defines an opening 21, the imaging assembly 50 is at least partially disposed in the opening 21 to emit light therethrough. In the embodiment, when the cover body 20 covers the main body 10, the imaging assembly 50 outputs the light through the opening 21, such configuration enables direct imaging projection, eliminating the need for auxiliary light-exit interfaces or complex optical path realignment, thereby streamlining a structural architecture of the projection while enhancing light-emitting efficiency and projection stability.

In some embodiments, the cover body 20 is rotatably connected to the main body 10, so as to cover or open the main body 10. For example, the cover body 20 is rotatably connected to the main body 10 for rotational displacement about a shaft at a connection point. Such rotational connection not only provides robust structural integration but also enables effortless operation, the users may execute covering or opening actions through gentle rotation of the cover body 20, thereby facilitating maintenance or reconfiguration of internal components within the main body 10.

For another example, the cover body 20 is detachably connected to the main body 10 through snap-fit engagement or threaded fastening. Such snap-fit configuration utilizes cooperative interaction between retention protrusions and receiving slots, enabling rapid fixation or separation of the cover body 20 and main body 10 for accelerated assembly/disassembly operations. The threaded fastening conversely provides heightened connection rigidity and stability through screw-thread coupling. A specific connection method between the cover body 20 and the main body 10 is flexibly selected based on practical application requirements and design specifications, thereby enhancing convenience of assembly and disassembly, so as to further improve practicality and maintainability of the projection device.

Figure 3:
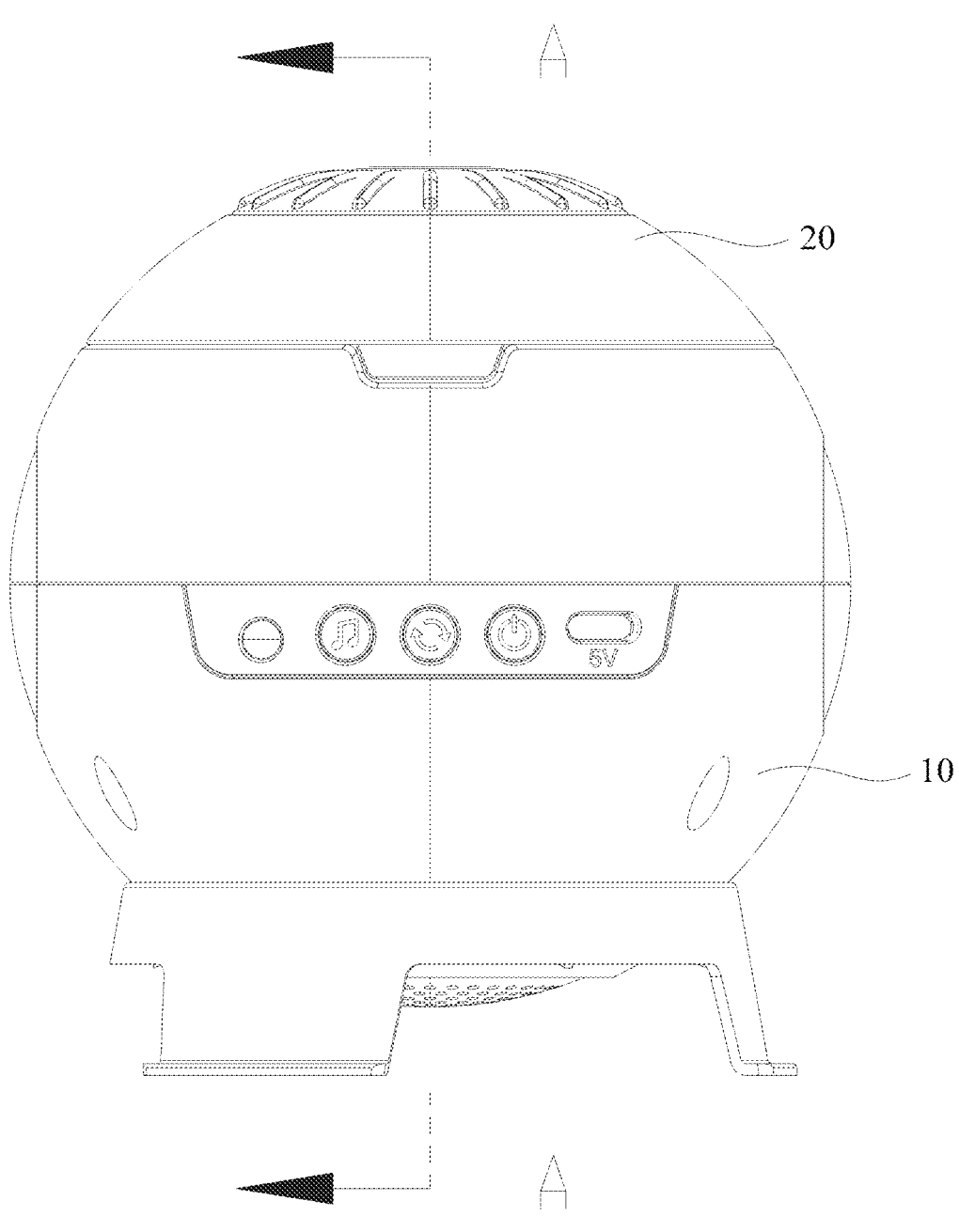
FIG. 3 is another structural schematic diagram of the projection device shown in FIG. 1.
Figure 4:
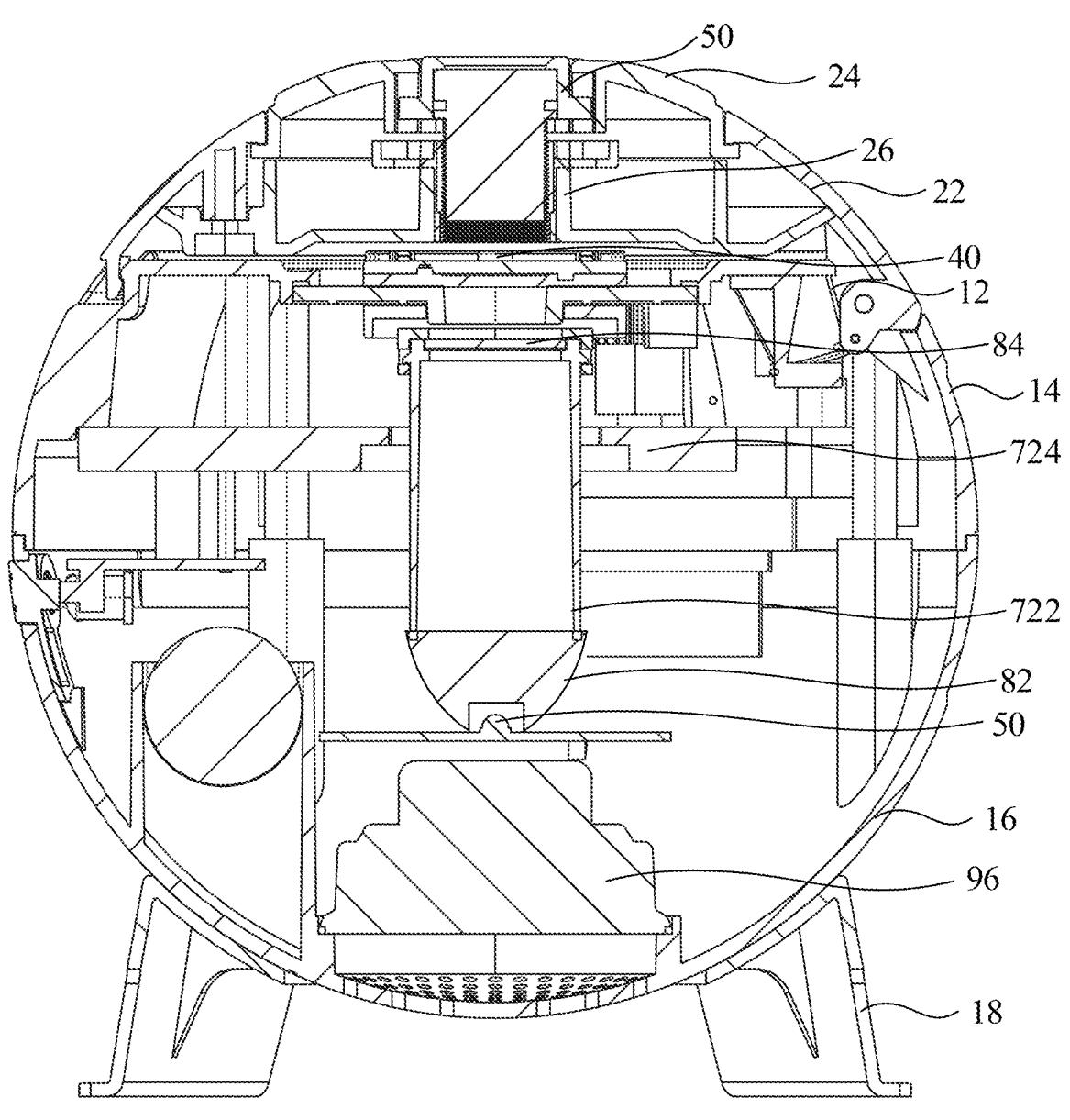
FIG. 4 is a cross-sectional schematic diagram of the projection device shown in FIG. 3, taken long the line A-A.

Please refer to FIGS. 3-4, FIG. 3 is another structural schematic diagram of the projection device shown in FIG. 1, and FIG. 4 is a cross-sectional schematic diagram of the projection device shown in FIG. 3, taken long the line A-A. In some embodiments, the projection device further includes an elastic component 12, the elastic component 12 is elastically connected between the cover body 20 and the main body 10, and the elastic component 12 is configured to drive the cover body 20 to cover the main body 10.

In the embodiment, the elastic component 12 is configured to apply an elastic force to drive the cover body 20 to automatically return to a closed position on the main body 10. Such design enables the cover body 20 to self-close under an action of the elastic component 12 once released by the users after being opened, thereby enhancing operational convenience.

It should be understood that the projection device further includes a rotating shaft 13, the cover body 20 is rotatably connected to the main body 10 through the rotating shaft 13. The elastic component 12 is a torsion spring, the elastic component 12 is sleeved on the rotating shaft 13 and is elastically connected between the cover body 20 and the main body 10. When the cover body 20 in an open position, the elastic component 12 exerts an elastic biasing force urging the cover body 20 to return to the closed position on the main body 10.

Furthermore, a magnetic connection structure is disposed at one side of the cover body 20. When the cover body 20 approaches the main body 10, the magnetic connection structure generates an attractive force that securely fastens the cover body 20 to the main body 10. Such design not only enhances connection strength between the cover body 20 and the main body 10 but also improves overall structural stability of the projection device, which effectively prevents unintended loosening or disengagement of the cover body 20 caused by accidental impacts or vibrations, thereby providing enhanced protection for the internal components and extending a service life of the projection device.

In some embodiments, the cover body 20 includes an outer frame 22 and a rotating cover 24, the outer frame 22 is movably connected to the main body 10, the outer frame 22 defines a mounting hole on a middle portion, the rotating cover 24 is disposed in the mounting hole and is capable of rotating with respect to the outer frame 22, the rotating cover 24 is connected to the imaging assembly 50 and is capable of driving the imaging assembly 50 to rotate to adjust a distance between the imaging assembly 50 and the film assembly 40.

In the embodiment, rotation of the rotating cover 24 enables precise adjustment of the distance between the imaging assembly 50 and the film assembly 40, so as to allow the users to flexibly regulate relative positions of the imaging assembly 50 and the film assembly 40 according to practical application requirements, thereby optimizing projection performance and achieving sharper, more accurate image projection. Additionally, the users may easily fine-tune a position of the imaging assembly 50 by rotating the rotating cover 24 to accommodate varying projection distances or environmental conditions, ensuring optimal projection quality.

In some embodiments, the cover body 20 includes a cover plate 26, the cover plate 26 is connected to the outer frame 22 and is disposed at a first side of the rotating cover 24 facing the main body 10. The cover plate 26 defines a through hole 261, the imaging assembly 50 is disposed in the through hole 261. First threads 51 are disposed on an outer surface of the imaging surface, second threads 262 are disposed on an inner wall of the through hole 261, and the second threads 262 are threadedly engaged with the first threads 51, so as to adjust the distance between the imaging assembly 50 and the film assembly 40.

In the embodiment, the imaging assembly 50 and the through hole 261 are connected through a threaded engagement, allowing the imaging assembly 50 to move along a threaded axis within the through hole 261. When adjustment of the distance between the imaging assembly 50 and the film assembly 40 is required, the users may rotate the rotating cover 24 clockwise or counterclockwise to move the imaging assembly 50 either toward or away from the film assembly 40, thereby increasing or decreasing the distance between the imaging assembly 50 and the film assembly 40. During the rotation of the rotating cover 24, the users may visually assess projected image quality on the projection surface to determine whether a current distance is optimal. If a projected image appears blurry or does not meet desired size requirements, further fine-tuning is achieved by continuing to rotate the rotating cover until optimal projection clarity and image quality are obtained. Such adjustment mechanism enables the users to precisely regulate the distance between the imaging assembly 50 and the film assembly 40 through simple rotational operations, thereby enhancing the projection performance. Additionally, the threaded engagement provides stable mechanical support, ensuring stability of the projection quality after adjustment.

It should be understood that the cover plate 26 and the outer frame 22 may be separately disposed or integrally formed as a single unit.

In some embodiments, the imaging assembly 50 includes a plurality of lenses. The cover body 20 includes the outer frame 22 and the rotating cover 24, the outer frame 22 is movably connected to the main body 10, the rotating cover is rotatably connected to the outer frame 22, and the rotating cover 24 is connected to the imaging assembly 50, so as to adjust a distance between at least two lenses.

In the embodiment, the imaging assembly 50 includes the lenses arranged according to a preset optical design and configuration. For example, the imaging assembly 50 includes at least three lenses, and the at least three lenses are selectively chosen from wide-angle lenses, standard lenses, and telephoto lenses based on application requirements. Such diversified lens configuration accommodates diverse optical performance requirements and supports various projection scenarios.

The rotating cover 24 is connected to a specific lens or lens group within the imaging assembly 50. When the rotating cover 24 is rotated, the specific lens or lens group moves along a preset optical axis direction. Such displacement alters a distance between the specific lens or lens group and other optical elements within the imaging assembly 50, thereby modulating key optical parameters, including focal length and image distance, to achieve imaging optimization. Specifically, precise image regulations, such as focus adjustment for enhanced sharpness and zoom operation for modifying the field of view angle range, are enabled. Such adjustment mechanism achieves fine-tuned control over inter-lens separation. By virtue of rotation, displacement distance of the specific lens is precisely regulated through controlled rotational angles, thereby catering to application-specific requirements for precise inter-lens distance across the various projection scenarios.

Please refer to FIGS. 5-7, FIG. 5 is a schematic diagram of first partial structures of the projection lamp shown in FIG. 1, FIG. 6 is an exploded schematic diagram of the first partial structures of the projection device shown in FIG. 5, and FIG. 7 is an enlarged schematic diagram of portion B shown in FIG. 6. In some embodiments. In some embodiments, the imaging assembly further includes a barrel 52, the lenses are partially disposed in the barrel 52. The cover body 20 includes the cover plate 26, the cover plate 26 is connected to the outer frame 22 and is disposed at the first side of the rotating cover 24 facing the main body 10. The cover plate 26 defines the through hole 261, the barrel 52 of the imaging assembly 50 is at least partially disposed in the through hole 261. The first threads 51 are disposed on the outer surface of the imaging surface, the second threads 262 are disposed on the inner wall of the through hole 261, and the second threads 262 are threadedly engaged with the first threads 51, so as to adjust the distance between the imaging assembly 50 and the film assembly 40.

In certain configurations, the cover plate 26 includes a cover plate main body and a threaded body. The cover plate main body defines a penetrating hole, the threaded body is disposed in the penetrating hole, the threaded body defines a threaded hole, and the second threads 262 are disposed in the threaded hole. Alternatively, the cover plate main body and the threaded body are integrally formed, that is, the cover plate 26 directly defines the threaded bore with the second threads 262 formed therein.

In the embodiment, a first part of the lenses are disposed in the barrel 52, the barrel 52 is configured to fix and support the lenses, ensuring positional stability while providing foundational structure for subsequent distance adjustment. Additional lenses (e.g., a second part of the lenses) are fixedly mounted to the cover plate 26, such that relative displacement between the barrel 52 and the cover plate 26 alters separation distance between the first part of the lenses in the barrel 52 and the second part of the lenses fixedly mounted to the cover plate 26.

The cover body 20 includes outer frame 22, the rotating cover 24, and the cover plate 26. The cover plate 26 is connected to the outer frame 22 and disposed at the first side of the rotating cover 24 facing the main body 10. That is, the cover plate 26 occupies an inward-facing position of the cover body 20 relative to the main body 10. The barrel 52 includes the first threads 51 on an outer surface thereof, while the through hole 261 of the cover plate 26 includes the second threads 262 for engaging with the first threads on the inner wall thereof. The barrel 52 and the cover plate 26 are fixedly connected through the threaded connection. Upon rotation of the rotating cover 24, the barrel 52 executes corresponding rotational motion due to a mechanical linkage thereof with the rotating cover 24. During this rotation, the first threads 51 on the outer surface of the barrel 52 and the second threads 262 on the inner wall of the through hole 261 interact through threaded transmission principles, thereby inducing axial displacement of the barrel 52 along an optical axis. Consequently, the first part of the lenses in the barrel 52 undergo coordinated axial displacement along the optical axis. Such movement alters a relative distance between the first part of the lenses and the second part of the lenses, thereby modulating optical parameters of the imaging assembly 50, including the focal length and the image distance, to enable the focus adjustment for the enhanced sharpness and the zoom operation for modifying the field of view angle range. Such configuration enables precise control over inter-lens distance. A fixed proportional relationship exists between a rotational angle of the threads and a linear displacement distance of the barrel 52. Precise regulation of a rotational angle of the rotating cover 24 thus allows exact determination of lens displacement distance, satisfying application-specific precision requirements for the inter-lens distance across the diverse imaging scenarios.

In some embodiments, the imaging assembly 50 includes at least one limiting protrusion 54, the rotating cover 24 defines at least one limiting groove 264, the at least one limiting protrusion 54 is engaged with the limiting groove 264 to drive the imaging assembly 50 to rotate by the rotating cover 24; or, the imaging assembly 50 defines the at least one limiting groove 264, the rotating cover 24 includes the at least one limiting protrusion 54, the at least one limiting protrusion 54 is engaged with the limiting groove 264 to drive the imaging assembly 50 to rotate by the rotating cover 24.

For example, the at least one limiting protrusion 54 on the imaging assembly 50 is precisely engaged with the at least one limiting groove 264 of the rotating cover 24. Upon rotation initiation of the rotating cover 24, a meshed engagement between the at least one limiting protrusion 54 and the at least one limiting groove 264 transmits rotational motion from the rotating cover 24 to the imaging assembly 50.

For another example, the at least one limiting protrusion 54 on the rotating cover 24 is precisely engaged with the at least one limiting groove 264 of the imaging assembly 50. Upon rotation initiation of the rotating cover 24, a meshed engagement between the at least one limiting protrusion 54 and the limiting groove 264 transmits rotational motion from the rotating cover 24 to the imaging assembly 50.

As the rotating cover 24 undergoes continuous rotation, the imaging assembly 50 correspondingly rotates, inducing positional realignment of the lenses in the imaging assembly 50, so that the distance between the imaging assembly 50 and the film assembly 40 is adjusted.

In some embodiments, the rotating cover 24 includes a rough surface for enhancing user grip traction for facilitated manipulation.

In some embodiments, protruding ribs are disposed on a second side of the rotating cover 24 facing away from the cover plate 26, and the protruding ribs are uniformly disposed around the imaging assembly 50 or the opening 21 for providing augmented tactile traction that streamlines rotational operation. When torque is applied through the protruding ribs, a geometric configuration of the protruding ribs 8 ensures stabilized and precise rotational control.

In some embodiments, one of the outer frame 22 and the rotating cover 24 includes graduated markings while the other includes an alignment indicator. For example, the outer frame 22 is provided with a circle of scale marks around the rotating cover 24, and the rotating cover 24 is provided with an indication arrow corresponding to the circle of the scale marks. For another example, the rotating cover 24 is provided with the circle of the scale marks at an edge thereof, and the outer frame 22 is provided with the indication arrow corresponding to the circle of the scale marks. When the rotating cover 24 rotates, the users may accurately know a rotation angle of the rotating cover 24 relative to the outer frame 22 by observing a relative position change between the indication arrow and a corresponding scale mar Such design enables the users to accurately control a rotation amount of the rotating cover 24, thereby accurately adjusting the rotation angle of the imaging assembly 50 and the lenses, satisfying inter-lens spacing adjustment under different optical requirements, and improving accuracy and controllability of the adjustment process.

In some embodiments, the main body 10 defines a notch 11 on one side facing the cover body 20, the notch 11 is configured to partially expose the cover body 20 for opening 21 the cover body 20.

In the embodiment, since the notch 11 partially exposes the cover body 20, a user may directly insert a finger into the notch 11 and apply a force in an appropriate direction to an exposed portion of the cover 20, which allows the cover body 20 to be easily opened from the main body 10, effectively preventing difficulty in opening caused by tight fitting between the cover body 20 and main body 10, so as to reduce operation difficulty and improves ease of use.

Please refer to FIGS. 8-9, FIG. 8 is a schematic diagram of second partial structures of the projection lamp shown in FIG. 1, and FIG. 9 is an enlarged schematic diagram of portion A shown in FIG. 8. In some embodiments, the film assembly 40 includes a support component 42 and a film sheet 44, the support component 42 is disposed in the main body 10, and the film sheet 44 is detachably mounted on the support component 42. When the cover body 20 and the main body 10 are in an open state, the main body 10 exposes the film sheet 44.

In the embodiment, the support component 42 provides a stable mounting position for the film sheet 44 and is provided with corresponding mounting structures to enable detachable installation of the film sheet 44. In this way, positional accuracy and stability of the film sheet 44 during operation is ensured. The film sheet 44 carries patterns which constitute content to be projected by the projection device. During projection, the film sheet 44 modulates the light signals from the light-emitting assembly 30 to form the projectable light signals. When mounting or removing the film sheet 44, the cover body 20 is first opened to expose the film sheet 44 in the main body 10. Specifically, when mounting the film sheet 44, the film sheet 44 is placed onto the support component 42 in a correct orientation and position, and is fixed using the mounting structures on the support component 42, so that tight contact and precise positioning between the film sheet 44 and the support component 42 are ensured; when detaching the film 44, the cover body 20 is first opened, the mounting structures for fixing the film sheet 44 to the support component 42 is released, and then the film sheet 44 is removed from the support component 42. Such detachable installation method allows the users to quickly replace different types of the film sheet 44 according to varying projection requirements, thereby enhancing versatility and adaptability of the projection device.

In some embodiments, the support component 42 includes a support portion and a snap-fit portion 424, the support portion is configured to support the film sheet 44, the snap-fit portion 424 is connected to a periphery of the support portion 422, and the snap-fit portion 424 is configured to limit the film sheet 44.

In the embodiment, when mounting the film sheet 44, the film sheet 44 is placed on the support portion 422. Then, through elastic or mechanical structures of the snap-fit portion 424 connected to the periphery of the support portion 422, the snap-fit portion 424 tightly contacts an edge of the film sheet 44 to fix the film sheet 44. A shape and a size of the snap-fit portion 424 match those of the film sheet 44, enabling snap-fit engagement and positioning along the edge of the film sheet 44, so as to prevents displacement or shaking of the film sheet 44 during operation, ensuring positional accuracy and stability. Consequently, modulation of the light signals by the patterns on the film sheet 44 proceeds as precisely expected, guaranteeing clear, accurate, and compliant projected images. Simultaneously, such snap-fit method facilitates removal and replacement of the film sheet 44, allowing the users to quickly exchange different types of the film sheet 44 to satisfy diverse projection requirements.

In some embodiments, the snap-fit portion 424 includes snap-fit retainers 4242, the snap-fit retainers 4242 are disposed at intervals, a first end of each of the snap-fit retainers 4242 is fixedly connected to the support portion 422, and the snap-fit retainers 4242 are configured to clamp the film sheet 44.

In the embodiment, the first end of each of the snap-fit retainers 4242 is fixedly connected to the support portion 422 while a second end of each of the snap-fit retainers is configured as a free end having elasticity. When mounting the film sheet 44, the film sheet 44 is placed onto the support portion 422. Elastic deformation of each of the snap-fit retainers 4242 then causes a corresponding free end to maintain flush contact with the periphery of the film sheet 44, thereby clamping and fixing the film sheet 44. In this way, displacement or vibration of the film sheet 44 is avoided during operation, ensuring positional accuracy and stability. Concurrently, spaced arrangement of the snap-fit retainers 4242 facilitates removal and replacement of the film sheet 44, enabling the users to quickly exchange different types of the film sheet 44 according to the varying projection requirements.

In some embodiments, at least some of the snap-fit retainers 4242 include a positioning protrusion 4243 at a second end thereof, each positioning protrusion 4243 is disposed on one side of a corresponding one of the snap-fit retainers 4242 facing the film sheet 44. When the film sheet 44 is mounted on the support component 42, the film sheet 44 is disposed between each positioning protrusion 4243 and the support portion 422.

In the embodiment, the first end of each of the snap-fit retainers 4242 is fixedly connected to the support portion 422 while the second end of each of the snap-fit retainers is configured as a free end. The free end is provided with the positioning protrusion 4243, each positioning protrusion 4243 is disposed on the one side of the corresponding one of the snap-fit retainers 4242 facing the film sheet 44. When mounting the film sheet 44, the film sheet 44 is placed onto the support portion 422, the free end of each of the snap-fit retainers 4242 is pressed to induce elastic deformation, and then the film sheet 44 is slid pa each positioning protrusion 4243 until clamped between each positioning protrusion 4243 and support portion 422. The film sheet 44 is thus limited between each positioning protrusion 4243 and support portion 422. Each positioning protrusion 4243 is configured to prevent vertical displacement of the film sheet 44 relative to the support component 42.

In some embodiments, the film sheet 44 defines at least one limiting notch 441, the support portion 422 includes a support plate 4222 and at least one limiting portion 4224, the at least one limiting portion 4224 protrudes from the support portion 422, the film sheet 44 is disposed on the support plate 4222, and the at least one limiting portion 4224 is disposed in the at least one limiting notch 441.

In the embodiment, when mounting the film sheet 44, the film sheet 44 is placed on the support plate 4222, ensuring that the at least one limiting notch 441 aligns with the at least one limiting portion 4224, slight pressure is the applied to the film sheet 44, allowing the at least one limiting portion 4224 to insert into the at least one limiting notch 441. Such configuration effectively restricts lateral displacement of the film sheet 44, enhancing operational stability, preventing image blurring or misalignment caused by vibration or looseness, and ensuring projection/imaging accuracy and quality. Simultaneously, such design further provides operational convenience, the user can effortlessly remove and replace different types of the film sheet 44 to fulfill different requirements without specialized tools or complex procedures, improving device practicality and flexibility. Furthermore, such structurally simple solution facilitates manufacturing and assembly, so as to reduce production costs and increasing efficiency.

In some embodiments, the projection device further includes a driving component 62 and a gear assembly. The driving component 62 and the gear assembly are disposed in the main body 10, the support component 42 includes a toothed portion 426 at an edge thereof, the driving component 62 is engaged with the toothed portion 426 of the support component 42 through the gear assembly to drive the support component 42 and the film sheet 44 to rotate.

In the embodiment, upon actuation of the driving component 62, power is transmitted through the gear assembly 64 to the toothed portion 426 of the support component 42, thereby directly driving rotation of both the support component 42 and the film sheet 44 mounted thereon. Such configuration eliminates the need for additional connecting components since the toothed portion 426 at the edge of the support component 42 directly engages the gear assembly 64 to form an efficient driving system that simplifies mechanical structure and enhances transmission efficiency. Through gear ratio adjustment of the gear assembly 64, rotational speed and angle of the support component 42 are precisely controlled, thereby achieving accurate rotation management of the film sheet 44. Such precision is critical for high-quality dynamic image projection, ensuring clear and stable projected images that satisfy complex projection requirements. The toothed portion 426 at the edge of the support component 42 serves dual functions of carrying the film sheet 44 while engaging the gear assembly 64, resulting in structural simplicity.

In some embodiments, the driving assembly 64 includes a driving gear 642, and a driving shaft of the driving component 62 is fixedly connected to the driving gear 642. The driving gear 642 is engaged with the toothed portion 426 of the support component 42.

In the embodiment, upon actuation of the driving component 62, the driving shaft drives the driving gear 642 to rotate. Through direct engagement with the toothed portion 426 of the support component 42, the driving gear 642 transmits torque to rotate both the support component 42 and film sheet 44 mounted thereon. Consequently, only a single driving gear 642 is required for power transmission, simplifying a drive structure while reducing component count, cost, and failure risk. Simultaneously, such direct engagement enhances transmission efficiency and minimizes energy loss. By selecting an appropriate gear ratio between the driving gear 642 and toothed portion 426 of the support component 42, the rotational speed and angle of the support component 42 are precisely regulated, so as to achieve the accurate rotation management of the film sheet 44, and ensure stable and smooth operation that elevates the projected image quality to satisfy high-precision demands for dynamic image projection.

In some embodiments, the projection device further includes a bracket 72, the bracket 72 is disposed in the main body 10 and is disposed between the light-emitting assembly 30 and the film assembly 40. The bracket 72 includes a cylindrical body 722 and a plate body 724 disposed surrounding the cylindrical body 722, the cylindrical body 722 passes through the plate body 724, and the support component 42 is capable of rotating with respect to the cylindrical body 722. The film sheet 44 is at least partially disposed opposite to a first end of the cylindrical body, the light-emitting assembly 30 is at least partially disposed opposite to a second end of the cylindrical body 722. The driving component 62 is disposed on the bracket 72, and the driving component 62 and the support component 42 are respectively at two sides of the plate body 724.

In the embodiment, the cylindrical body 722 of the bracket 72 serves as part of an optical path channel, which provides a transmission route for the light emitted by the light-emitting assembly 30, ensures direct and efficient projection onto the film sheet 44, and minimizes light scattering and loss during propagation, thereby enhancing imaging clarity and quality. The driving component 62 and the support component 42 are respectively at the two sides of the plate body 724 of the bracket 72, optimizing spatial utilization within the projection device. The plate body 724 serves as a partitioning layer that isolates vibrations generated by the driving component 62 during operation from the support component 42 and film sheet 44, which ensures stable rotational drive of the support component 42 and synchronized rotation of the film sheet 44, enabling reliable dynamic image projection. Simultaneously, the bracket 72 provides robust support for the driving component 62, ensuring smooth operation of the driving component 62 and further enhancing overall stability of the projection device.

In some embodiments, the projection device further includes a pressing plate 74, the pressing plate 74 is disposed at one side of the bracket 72 facing away from the light-emitting component 30, the support component 42 is rotatably disposed at one side of the pressing plate 74 facing away from the bracket 72, and the pressing plate 74 and the bracket 72 are disposed in the main body 10.

In the embodiment, the pressure plate 74 serves as a carrier platform that cooperates with the bracket 72 to support and fix the support component 42, establishing a multi-point support structure. Such configuration delivers enhanced foundational stability for the support component 42 while effectively distributing rotational forces to mitigate wobbling or deformation inherent in single-point support systems. The support component 42 is rotatably disposed on the pressing plate 74, enabling simplified installation and removal. Maintenance personnel may replace or service the support component 42 only by manipulating connecting elements associated with the pressing plate 74 without disassembling the bracket 72 or complex components, which streamlines maintenance procedures and reduces associated costs. Concurrently, the pressing plate 74 and bracket 72 are respectively connected to the main body 10, which reinforces structural integrity to provide robust rotational support for the support component 42. Moreover, such design further facilitates disassembly and servicing, simplifying overall device maintenance of the projection lamp.

In some embodiments, the projection device further includes a first condenser 82 and a second condenser 84, the first condenser 82 is disposed at the second end of the cylindrical body 722, and the second condenser 84 is disposed at the first end of the cylindrical body 722.

In this embodiment, the cylindrical body 722 accommodates the first condenser 82 and the second condenser 84 at opposite ends. For example, the first condenser 82 is disposed at the second end of the cylindrical body 722 close to the light-emitting assembly 30 to collect and focus emitted light, reducing scattering and loss during propagation and improving light energy utilization rate. The second condenser 84 is disposed at the first end of the cylindrical body 722 close to the film sheet 44 to efficiently concentrate the light onto the film sheet 44, ensuring uniform illumination for enhanced imaging quality. Such dual-condenser configuration optimizes an optical path by enabling precise light transmission from the light-emitting assembly 30 to the film sheet 44 and onward to the projection surface. Consequently, projected images exhibit increased brightness and sharpness with elevated projection quality. The first condenser 82, the second condenser 84, and the support component 42 are all disposed on the cylindrical tube 722, which not only improves optical efficiency but also optimizes spatial utilization, delivering superior projection performance.

In some embodiments, the main body 10 includes a middle housing body 14 and a lower housing body 16, the bracket 72 and the pressing plate 74 are mounted in the middle housing body 14, while the film assembly 40 and driving component 62 are mounted onto the bracket 72 and pressing plate 74. These pre-assembled components are subsequently fixed to the lower housing body 16, facilitating streamlined assembly.

In some embodiments, the projection device further includes a control button and a circuit board 94, the circuit board 94 is disposed in the main body 10, and the control button is partially exposed for user actuation. The control button is connected to the circuit board 94, which in turn is connected to components, such as the driving component 62 and the light-emitting assembly 30, enabling control of corresponding functions of the projection device.

In some embodiments, the projection device further includes a speaker 96, the speaker 96 is disposed in the main body and is connected to the circuit board 94, and the speaker 96 is configured to output audio as needed.

In some embodiments, the main body 10 further includes a bottom base 18 to which the lower housing body 16 is mounted. The bottom base 18 elevates the lower housing body 16 above a supporting surface, such as a tabletop, thereby preventing direct contact and protecting both the lower housing body 16 and the internal components within the main body 10. Additionally, the bottom base 18 enhances stability and leveling of the main body 10 during placement. Furthermore, a sound outlet is formed on a bottom side of the lower housing body 16. The bottom base 18 elevates the lower housing body 16 to facilitate audio output through the sound outlet.

In some embodiments, the projection device further includes a battery 92, the battery is disposed in the main body 10. The battery 92 serves as a power source for various electrical components, including the driving component 62, the light-emitting assembly 30, the circuit board 94, and the speaker 96.

In the foregoing embodiments, description of each embodiment has its own emphasis, and parts that are not described in detail in an embodiment may refer to related descriptions of other embodiments. The embodiments, implementations, and related technical features of the present disclosure may be combined and replaced with each other without conflict.

The projection device in the embodiments of the present disclosure is described in detail above, and specific examples are used herein to describe principles and the embodiments of the present disclosure, and description of the above embodiments is only used to help understand a method of the present disclosure and a core idea thereof; meanwhile, for those who skilled in the art, according to the idea of the present disclosure, there may be changes in specific embodiments and application ranges. In summary, a content of the present specification should not be construed as limiting the present disclosure.

What is claimed is:

1. A projection device, comprising:
a main body;
a cover body;
a light-emitting assembly;
a film assembly; and
an imaging assembly;
wherein the cover body is movably connected to the main body;
wherein the light-emitting assembly is configured to emit light signals;
wherein the film assembly is disposed on a transmission path of the light signals;
wherein the imaging assembly is configured to image the light signals after passing through the film assembly, when the cover body covers the main body, the imaging assembly is disposed on one side of the film assembly facing away from the light-emitting assembly;
wherein the light-emitting assembly and the film assembly are disposed in the main body, and the imaging assembly is disposed in the cover body;
wherein the cover body comprises an outer frame and a rotating cover, the outer frame is movably connected to the main body, the outer frame defines a mounting hole on a middle portion, the rotating cover is disposed in the mounting hole and is capable of rotating with respect to the outer frame, the rotating cover is connected to the imaging assembly and is capable of driving the imaging assembly to rotate to adjust a distance between the imaging assembly and the film assembly.

2. The projection device according to claim 1, wherein the cover body defines an opening, the imaging assembly is at least partially disposed in the opening to emit light therethrough.

3. The projection device according to claim 2, wherein the cover body is rotatably connected to the main body, so as to cover or open the main body.

4. The projection device according to claim 3, wherein the projection device further comprises an elastic component, the elastic component is elastically connected between the cover body and the main body, and the elastic component is configured to drive the cover body to cover the main body.

5. The projection device according to claim 4, wherein the projection device further comprises a rotating shaft, the cover body is rotatably connected to the main body through the rotating shaft; and
the elastic component is a torsion spring, the elastic component is sleeved on the rotating shaft and is configured to drive the cover body to cover the main body.

6. The projection device according to claim 3, wherein the main body defines a notch on one side facing the cover body, the notch is configured to partially expose the cover body for opening the cover body.

7. The projection device according to claim 2, wherein the cover body comprises a cover plate, the cover plate is connected to the outer frame and is disposed at a first side of the rotating cover facing the main body;
the cover plate defines a through hole, the imaging assembly is disposed in the through hole;
first threads are disposed on an outer surface of the imaging surface, second threads are disposed on an inner wall of the through hole, and the second threads are threadedly engaged with the first threads, so as to adjust the distance between the imaging assembly and the film assembly.

8. The projection device according to claim 7, wherein protruding ribs are disposed on a second side of the rotating cover facing away from the cover plate, and the protruding ribs are uniformly disposed around the opening.

9. The projection device according to claim 1, wherein the imaging assembly comprises at least one limiting protrusion, the rotating cover defines at least one limiting groove, the at least one limiting protrusion is engaged with the limiting groove to drive the imaging assembly to rotate by the rotating cover; or
the imaging assembly defines the at least one limiting groove, the rotating cover comprises the at least one limiting protrusion, the at least one limiting protrusion is engaged with the limiting groove to drive the imaging assembly to rotate by the rotating cover.

10. The projection device according to claim 1, wherein the film assembly comprises a support component and a film sheet, the support component is disposed in the main body, and the film sheet is detachably mounted on the support component; and
when the cover body and the main body are in an open state, the main body exposes the film sheet.

11. The projection device according to claim 10, wherein the support component comprises a support portion and a snap-fit portion, the support portion is configured to support the film sheet, the snap-fit portion is connected to a periphery of the support portion, and the snap-fit portion is configured to limit the film sheet.

12. The projection device according to claim 11, wherein the snap-fit portion comprises snap-fit retainers, the snap-fit retainers are disposed at intervals, a first end of each of the snap-fit retainers is fixedly connected to the support portion, and the snap-fit retainers are configured to clamp the film sheet.

13. The projection device according to claim 12, wherein at least some of the snap-fit retainers comprise a positioning protrusion at a second end thereof, each positioning protrusion is disposed on one side of a corresponding one of the snap-fit retainers facing the film sheet; and when the film sheet is mounted on the support component, the film sheet is disposed between each positioning protrusion and the support portion.

14. The projection device according to claim 11, wherein the film sheet defines at least one limiting notch, the support portion comprises a support plate and at least one limiting portion, the at least one limiting portion protrudes from the support portion, the film sheet is disposed on the support plate, and the at least one limiting portion is disposed in the at least one limiting notch.

15. The projection device according to claim 10, wherein the projection device further comprises a driving component and a gear assembly;

the driving component and the gear assembly are disposed in the main body, the support component comprises a toothed portion at an edge thereof, the driving component is engaged with the toothed portion of the support component through the gear assembly to drive the support component and the film sheet to rotate.

16. The projection device according to claim 15, wherein the gear assembly comprises a driving gear, and a driving shaft of the driving component is fixedly connected to the driving gear; and the driving gear is engaged with the toothed portion of the support component.

17. The projection device according to claim 15, wherein the projection device further comprises a bracket, the bracket is disposed in the main body and is disposed between the light-emitting assembly and the film assembly;

the bracket comprises a cylindrical body and a plate body disposed surrounding the cylindrical body, the cylindrical body passes through the plate body, and the support component is capable of rotating with respect to the cylindrical body; and the film sheet is at least partially disposed opposite to a first end of the cylindrical body, the light-emitting assembly is at least partially disposed opposite to a second end of the cylindrical body; and the driving component is disposed on the bracket, the driving component and the support component are respectively at two sides of the plate body.

18. The projection device according to claim 17, wherein the projection device further comprises a pressing plate, the pressing plate is disposed at one side of the bracket facing away from the light-emitting component, the support component is rotatably disposed at one side of the pressing plate facing away from the bracket, and the pressing plate and the bracket are disposed in the main body.

19. The projection device according to claim 18, wherein the projection device further comprises a first condenser and a second condenser, the first condenser is disposed at the second end of the cylindrical body, and the second condenser is disposed at the first end of the cylindrical body.

20. A projection device, comprising:
a main body;
a cover body;
a light-emitting assembly;
a bracket;
a driving component disposed in the main body;
a film assembly; and
an imaging assembly;
wherein the cover body is movably connected to the main body;
wherein the light-emitting assembly is configured to emit light signals;
wherein the film assembly is disposed on a transmission path of the light signals;
wherein the imaging assembly is configured to image the light signals after passing through the film assembly, when the cover body covers the main body, the imaging assembly is disposed on one side of the film assembly facing away from the light-emitting assembly;
wherein the light-emitting assembly and the film assembly are disposed in the main body, and the imaging assembly is disposed in the cover body;
wherein the film assembly comprises a support component and a film sheet, the support component is disposed in the main body, the film sheet is detachably mounted on the support component, and when the cover body and the main body are in an open state, the main body exposes the film sheet;
wherein the bracket is disposed in the main body and is disposed between the light-emitting assembly and the film assembly;
wherein the bracket comprises a cylindrical body and a plate body disposed surrounding the cylindrical body, the cylindrical body passes through the plate body, and the support component is capable of rotating with respect to the cylindrical body;
wherein the film sheet is at least partially disposed opposite to a first end of the cylindrical body, the light-emitting assembly is at least partially disposed opposite to a second end of the cylindrical body;
wherein the driving component is disposed on the bracket, the driving component and the support component are respectively at two sides of the plate body.

* * * * *